Figures 1, 2:
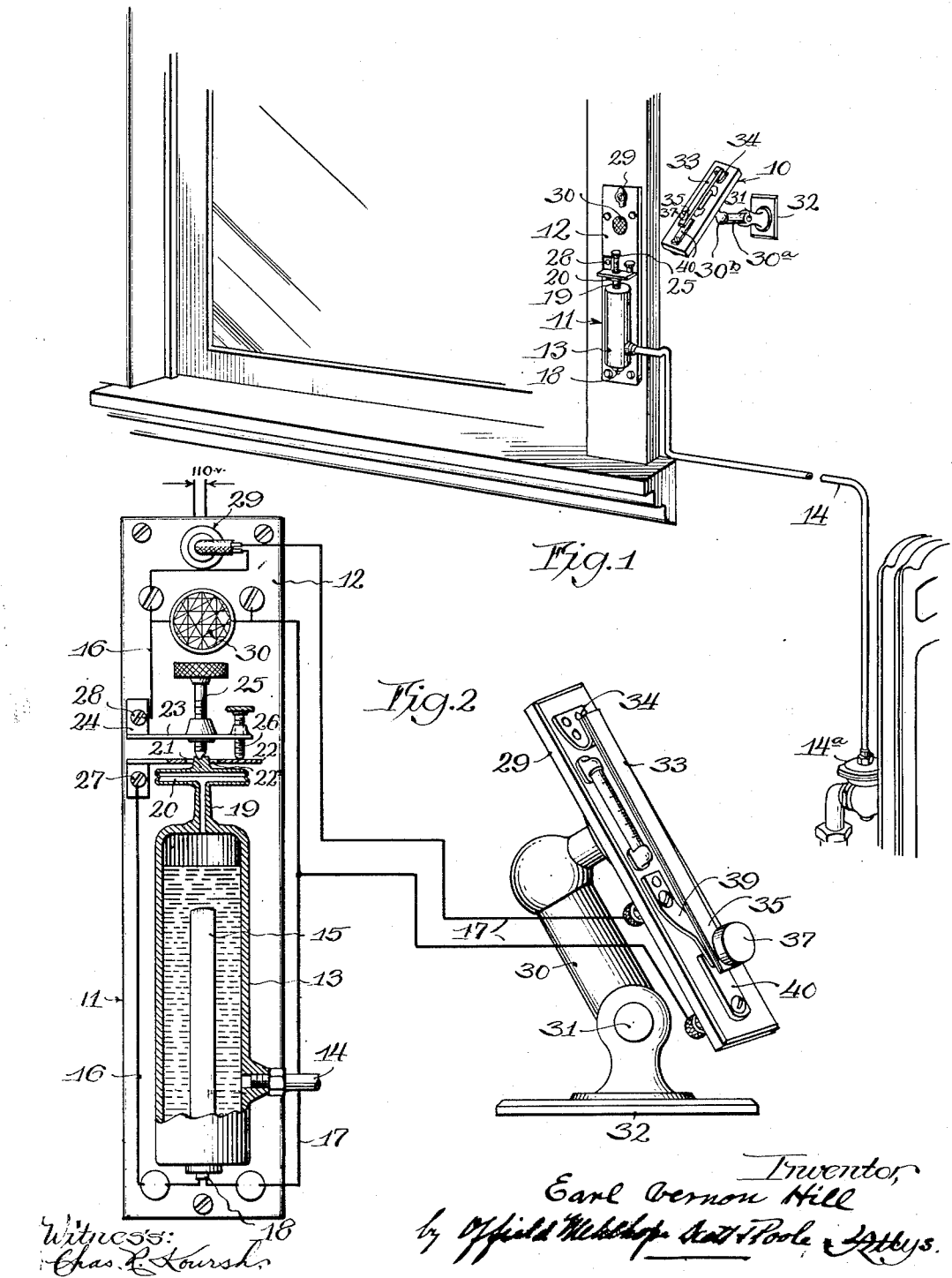

Sept. 4, 1928.  
E. V. HILL  
1,682,905  
THERMOSTAT CONTROL FOR RADIATOR VALVES  
Filed Sept. 21, 1925

Inventor,  
Earl Vernon Hill

Patented Sept. 4, 1928.

1,682,905

UNITED STATES PATENT OFFICE.

EARL VERNON HILL, OF CHICAGO, ILLINOIS.

THERMOSTAT CONTROL FOR RADIATOR VALVES.

Application filed September 21, 1925. Serial No. 57,561.

This invention relates to a novel and improved thermostatic control for radiator valves, and consists of the matters hereinafter described and more particularly pointed out in the appended claims.

In the present more generally adopted thermostatic controls for radiators, the radiator valves are actuated from a central station at or near the boiler by means of fluid pressure means exerted through long pipes or tubes extending from such station to each radiator to be controlled in accordance with a thermostat located in each of the rooms containing a radiator. Such systems are expensive to install and, by reason of the resistance in the long pipes or tubes used, are not instantly responsive to the thermostatic control in the several rooms and have other objections known to those familiar with the art and which it is unnecessary to enumerate in detail herein.

Unit control devices have been designed,— that is to say, control devices in which the thermostat member and the motor or valve operating member are located in the same room with the radiator which is to be controlled, but these generally have either the thermostat or the motor member in close association or connection with the radiator, so that they are affected by the temperature of the radiator which modifies or hinders their proper operation.

The object of my invention is to provide a unit thermostat control for radiator valves in which both the thermostat and the motor member of the apparatus are entirely separate from, independent of and unaffected by the temperature of the heater or radiator. Another object of the invention is to provide a device of the kind of simple and economical construction, which comprises few and readily assembled parts and by which a quick operation of the valve is assured.

The many advantages of my invention will appear more fully as I proceed with my specification. The automatic control is applicable for use not only to radiator valves, but also to any other valves or dampers, which must be operated, subject to temperature conditions in a room or rooms.

In the drawings:—

Figure 1 is a somewhat diagrammatic perspective view showing an installation of my improved control device.
Figure 2 is a view on an enlarged scale showing the motor member in front elevation and the thermostat in perspective, with a diagrammatic indication of the wiring connecting them.

Referring now to that embodiment of my invention illustrated in the drawings: 10 indicates a thermostat member and 11 indicates a thermostatically operated motor member which is operatively connected to the radiator valve to operate it by fluid pressure in a familiar manner. It will be understood that the valve is normally held open and is adapted to be closed by fluid pressure in a familiar manner to close off the steam supply to the radiator, in which closed position it remains until released by the fluid pressure controlled by the motor member.

Referring now to the motor member 11, it will be understood that this may be placed or fixed in any part of the room, as on a window or door jamb, its distance from the radiator being immaterial, except as to the length of the tube required to connect it to the valve casing. It should be, however, far enough away from the radiator to make it absolutely independent of the heat in the immediate neighborhood of the radiator or the heat of the steam therein. As the radiator is usually placed near a window, this motor member can be conveniently placed on the jamb of the same window.

The parts comprising the motor member may be mounted on a narrow back or base 12 which is attached to the window jamb by means of screws at the top and bottom. 13 indicates an elongated tube or vessel attached to the base 12 in any convenient manner and containing alcohol or some other liquid of low boiling point. 14 indicates a pipe connected to the bottom of the tube and leading therefrom to the diaphragm valve 14$^a$ of the radiator which is to be controlled. In said tube or vessel 13, is located a heating element 15 which is connected to electric conductors 16, 17 led into the bottom end of the vessel 13 by means of a plug 18 in a familiar manner.

The vessel 13 is provided at its top end with a narrow neck 19 which is connected to a flat expansion disc 20 located above the top end of the vessel. On the top side of the expansion disc is fixed a centrally disposed stud 21. 22 indicates a contact plate fixed to the base 12 and extending diametrically across but slightly above the top side of the disc 20,—said plate being provided with a hole 22$^a$ for the free passage through it of the stud 21. Above the contact plate 22 is a spring contact bar 23 fixed at one end, as at 24, to the base 12 and extending parallel to and at a short distance above the plate 22. Said spring plate is thickened somewhat at its middle by means of a boss, through which is threaded a set screw 25 which is in line with and normally engaged with the stud 21. The spring contact bar 23 carries a contact screw 26 at its free end which normally engages the end of the contact plate 22.

Manifestly when the liquid in the vessel 13 boils, the disc 20 is caused to expand by the pressure developed therein, and the top side of the disc will rise and with it the stud 21 so that by said stud and its contact with the bottom end of the set screw 25, the contact bar 23 will be lifted to break the connection between the contact screw 26 and the contact plate 22. 27 indicates a binding post on the plate 22 and 28 indicates a binding post on the contact bar 23. The two line conductors 16, 17 are connected to the usual electric light circuit by means of a plug and socket 29 attached to the top of the base 12. The contacts 27 and 28 are interposed in the line wire 16; the other line wire 17, includes the thermostat 10. Bridged across the two conductors 16, 17, between the thermostat and the heating element 15 on one side and between the plug 29 and the heating element 15 on the other side, is a lamp 30.

The operation of the motor member is as follows:—The circuit through the wire 17 in which the thermostat is interposed is normally open and remains open until closed by the thermostat. When the temperature of the room rises above the predetermined temperature at which it is intended to be maintained, the thermostat acts to close the circuit in the wire 17 in a familiar manner. The line wire 16 is normally closed by reason of the contact of the screw 26 with the contact plate 22. Thus when the circuit in the other line wire is closed by the thermostat, the electric circuit from the plug 29 is closed through the heating or thermal element 15 in the vessel 11. The thermal element will therefore be heated and this heat, imparted to the liquid in the vessel 13 will cause said liquid to boil and induce pressure in the disc 20. The disc will expand and act to raise the stud 21 and with it the set screw 25, by means of which the contact bar 23 is lifted to disengage the contact screw 26 from the contact plate 22. This breaks the electric circuit through the line wire 16 and stops the flow of current to the heating or thermal member 15.

The thermostat member 10 consists of a plate 29 fixed on a bracket arm 30 which is hinged at 31 to a base 32. The base 32 may be attached to the wall as shown in Figure 1 or, in the case of the use of the device in a school room, it is adapted to be placed on a teacher's desk so she may have it near her for such adjustment of the thermostatic control, as may be necessary.

33 indicates a thermostatic bar made in the familiar manner of strips of material of different coefficients of expansion. Said bar is mounted at the top of the plate 29 by means of a spring 34 so that its bottom end 35 may swing towards or away from the plate 29. Said bottom end is provided with a small weight 37 on its top side, and its bottom side is adapted to engage a flat spring contact 39 arranged in line with a second contact 40. When the bottom end 35 of the thermostatic member 33 is swung toward the plate 29 a contact is made between the two contacts 39 and 40. This contact is made and broken by reason of the unequal expansion of the two elements comprising the thermostatic element 33.

When the plate 29 is in a vertically upright position (to which position it may be brought by swinging it about the pivotal point 31), the weight 37 will have no effect on the operation of the thermostatic member. When the plate 29 is swung to the position shown or to a more inclined position, the effect of the weight 37 in aiding to bring the two contacts 39, 40 together will be increased, the greater the angle the plate 29 makes with the vertical.

When the thermostatic member 10, by reason of the rise of the temperature in the room to the predetermined maximum, acts to close the circuit through the wire 17, not only is the circuit through the thermal or heating element 15 closed, but the circuit through the lamp 30 is likewise closed. The lamp 30 thus lights and indicates the instant when the motor member 11 is started into operation. Thus, the lamp will indicate that the thermostat is operating at the required maximum temperature. By reason of the expansion of the fluid in the disc 20, the connection is broken between the contact screw 26 and the contact plate 22. This occurs at the instant when sufficient pressure has been built up in the tube 13 and its connecting pipe 14 to the valve 14ª to close said valve. By adjusting the set screw 25, the pressure required to be built up in the tube 13 in order to break the connection between the contact screw 26 and the contact plate 22 may be adjusted, and this pressure will be brought to correspond to just that pressure required to close the valve 14ª. The minute this pressure is reached in the tube 13 and its connecting pipe 14, the circuit through the wire 16 is broken, so that the supply of current to the thermal element 15 is stopped and the pressure in the pipe 14 is not built up beyond the point required to close the valve. Thus excessive pressure in the pipe 14, above the predetermined pressure required to operate the valve, is not produced to require a considerable period of time for its reduction to and below the predetermined required pressure after the discontinuance of the supply to the thermal element 15, so that a more quickly operating mechanism is produced, it only being necessary for the pressure to fall from the predetermined maximum therein and not from a much higher pressure to a pressure below said predetermined maximum, in order to permit the opening of the valve.

Upon the fall of the temperature in the room below the maximum, at which the thermostatic member 10 is designed to operate, the electric circuit in the wire 17 will be broken and the parts will be restored to their original condition after the cooling effect of the atmosphere on the tube 13 has reduced the pressure in said tube and in the pipe 14 to a point below the pressure required to close the valve, a sufficient amount to permit said valve to open.

While in describing my invention I have referred to several details of mechanical construction and arrangement of parts, it will be understood that the invention is not limited thereto, except as may be pointed out in the appended claims.

I claim as my invention:—

1. In combination with a thermostatic member and a shut-off device to be controlled thereby, a motor member remote from said shut-off device comprising a vessel containing a liquid of low boiling point, a pipe connecting said vessel to said shut-off device for operating the same by the pressure developed in said vessel, a thermal element associated with said vessel, conductors for supplying electric current to said thermal element, one of said conductors including the thermostatic member, a normally closed make-and-break switch interposed in the other conductor, and means by which said switch is adapted to be opened upon the development of a predetermined pressure in said vessel.

2. In combination with a thermostatic member and a shut-off device to be controlled thereby, a motor member remote from said shut-off device comprising a vessel containing a liquid of low boiling point, a pipe connecting said vessel to said shut-off device for operating the same by the pressure developed in said vessel, a thermal element associated with said vessel, conductors for supplying electric current to said thermal element, one of said conductors including the thermostatic member, a normally closed make-and-break switch interposed in the other conductor, means by which said switch is adapted to be opened upon the development of a predetermined pressure in said vessel, and means for adjusting said predetermined pressure.

3. In combination with a thermostatic member and a shut-off device to be controlled thereby, a motor member remote from said shut-off device comprising a vessel containing a liquid of low boiling point, a pipe connecting said vessel to said shut-off device for operating the same by the pressure developed in said vessel, a thermal element associated with said vessel, conductors for supplying electric current to said thermal element, one of said conductors including the thermostatic member, a normally closed make-and-break switch interposed in the other conductor, means by which said switch is adapted to be opened upon the development of a predetermined pressure in said vessel, and an indicator device in circuit with said thermostatic member.

4. In combination with a thermostatic member and a shut-off device to be controlled thereby, a motor member remote from said shut-off device comprising a vessel containing a liquid of low boiling point, a pipe connecting said vessel to said shut-off device for operating the same by the pressure developed in said vessel, said vessel being provided with an expansion member, a thermal element in said vessel, conductors for supplying electric current to said thermal element, one of said conductors including the thermostatic member, a switch interposed in the other conductor, said switch including a fixed contact and a movable contact normally engaged therewith, and a set screw carried by said movable contact and adapted for engagement with said expansion member.

5. In combination with a thermostatic member and a shut-off device to be controlled thereby, a motor member remote from said shut-off device comprising a vessel containing a liquid of low boiling point, a pipe connecting said vessel to said shut-off device for operating the same by the pressure developed in said vessel, said vessel being provided with an expansion member, a thermal element in said vessel, conductors for supplying electric current to said thermal element, one of said conductors including the thermostatic member, a switch interposed in the other conductor, said switch including a fixed contact and a movable contact normally engaged therewith, a set screw carried by said movable contact and adapted for engagement with said expansion member, and a lamp in circuit with said thermostatic member.

In testimony that I claim the foregoing as my invention, I affix my signature this 18th day of September, A. D. 1925.

EARL VERNON HILL.